US007369509B2

(12) United States Patent
Lapeyre et al.

(10) Patent No.: US 7,369,509 B2
(45) Date of Patent: May 6, 2008

(54) SYSTEM AND METHOD FOR FACILITATING NETWORK TROUBLESHOOTING

(75) Inventors: Jean Pierre Lapeyre, San Diego, CA (US); Sergey Vladimirovich Kryuchkov, Morrisville, NC (US); Gary A. Meyer, Raleigh, NC (US); Jay Stewart, Raleigh, NC (US)

(73) Assignee: Acterna LLC, Germantown, MD (US)

( * ) Notice: Subject to any disclaimer, the term of this patent is extended or adjusted under 35 U.S.C. 154(b) by 938 days.

(21) Appl. No.: 10/793,358

(22) Filed: Mar. 4, 2004

(65) Prior Publication Data

US 2005/0195797 A1   Sep. 8, 2005

(51) Int. Cl.
*H04L 12/66* (2006.01)
(52) U.S. Cl. ...................... 370/252; 370/442
(58) Field of Classification Search ........ 370/352–356, 370/250
See application file for complete search history.

(56) References Cited

U.S. PATENT DOCUMENTS

| 7,197,010 | B1* | 3/2007 | Berstein et al. | 370/252 |
| 2004/0001501 | A1* | 1/2004 | Delveaux et al. | 370/442 |
| 2005/0053009 | A1* | 3/2005 | Denby et al. | 370/250 |

* cited by examiner

*Primary Examiner*—Creighton Smith
(74) *Attorney, Agent, or Firm*—Allen, Dyer, Doppelt, Milbrath & Gilchrist, P.A.

(57) ABSTRACT

A computer program product being embodied on a computer readable medium for facilitating troubleshooting a VoIP session associated with at least one VoIP station using network traffic data, the computer program product including computer-executable instructions for: identifying data packets of the network traffic data indicative of VoIP signaling information or voice communications; determining if the identified packets are associated with the at least one VoIP station; determining whether a quality of the VoIP session was acceptable substantially simultaneously with the VoIP session; and, at least temporarily storing at least a portion of the identified packets determined to be associated with the at least one VoIP station when the VoIP session is determined to of an unacceptable quality.

23 Claims, 7 Drawing Sheets

Fig. 6

Agent Builder

Please, fill the following form. All bolded fields are required.
(Each field can not exceed 4096 characters)

Input File Name: virtech.tpl

Contact Information

| | |
|---|---|
| Customer Name: | Anyone |
| Technician Name: | Sergey Kryuchkov |
| Technician Phone Number: | (919) 388-5076 (no extension) |
| Technician E-mail address: | sergey.kryuchkov@acterna.com |
| Comments: | this is Dispatchless Agent template for generation the customer spe |

FTP Information

| | |
|---|---|
| FTP Server Name (or IP Address): | ftp.en-ssi.acterna.com |
| FTP Location for Capture Files: | /Inbound/PVA_test |
| FTP User Name: | anonymous |
| FTP User Password: | no-password |
| | ☑ Send Files via FTP |

Agent Information

| | |
|---|---|
| Expiration (days): | 90 |
| Capture: | All Packets Related to Call |

Build     Close

Output File Name:

SYSTEM AND METHOD FOR FACILITATING NETWORK TROUBLESHOOTING

FIELD OF THE INVENTION

The present invention relates to systems and methods for troubleshooting networks, such as Internet Protocol (IP) networks, and applications utilizing such networks, such as Voice over IP (VoIP) systems.

BACKGROUND OF THE INVENTION

As networks, and applications that utilize them, become more and more complex, so do potential problems associated with them. Analogously, as problems become potentially more and more complex, so does troubleshooting and remedying them.

For purposes of completeness, "network" as used herein generally refers to any group of two or more network devices, such as VoIP stations and computers, linked together. Common examples of networks include Local Area Networks, Wide Area Networks, Campus Area Networks, Home Area Networks and the global interconnection of computers, and other computing devices, commonly referred to as the Internet. As used herein, "VoIP station" generally refers to an IP telephone or other network element involved in the transport, creation, or termination of VoIP packets, while "computer" generally means a programmable machine, like a commercially available Personal Computer (PC). Further, by way of non-limiting example also, "application" as used herein generally refers to any program or group of programs designed for end users or for another program. Common examples of applications include database programs, word processors, and spreadsheets.

Internet Protocol (IP) networks use a particular format of packets, also called datagrams, and addressing scheme. IP uses datagrams that include headers that provide information related to the data being transmitted. A network that utilizes IP is one example of a packet switched network. Each packet is transmitted individually and can even follow different routes to its destination. Once all the packets forming a message arrive at the destination, they are recompiled into the original message. Packet headers typically specify type of service (ToS), identification values, the allowability of datagram fragmenting, time to live values, protocol identifiers, source and destination addresses and padding, by way of non-limiting example only. This information may be used to route payload data across an IP network from a source IP address to a destination IP address.

The present invention will be described as it relates to VoIP systems and their underlying IP networks for purposes of explanation and by way of non-limiting example only. For purposes of completeness only, VoIP is a category of application that enables people to use packet switched networks as a transmission medium for telephone calls. Of course other applications, such as Fax over IP (FIP) may be suitable for use with the present invention also. Further, other types of networks and protocols may be suitable for use with the present invention as well.

In order to send voice over a packet network, one first digitizes the voice signal, using an Analog-to-Digital (A/D) converter and Pulse-Code Modulation (PCM) for example. Commercially available computer sound cards may be used to accomplish this digitization. The digitally sampled and quantized voice signal may then be routed across the network using conventional packet switching methodologies, such as those associated with IP. The received signal may then be reconstructed into analog form for listening. This is, in essence, the reverse of digitization, and may also be accomplished using a commercially available computer sound card. For return voice communications, the same methodology may be used.

When users of VoIP stations experience problems, such as by experiencing audio distortion, a need exists for a method and system for rapid troubleshooting. For example, VoIP users typically want quality and reliability associated with Private Branch Exchange (PBX) systems. In other words, users typically want very few noticeable errors and low delays, such as with conventional telephone systems like PBX systems. With packetized voice however, each packet will typically arrive with a slightly different amount of delay, resulting in jitter. Also, due to the nature of packet networks in general, some packets will inevitably include errors on arrival or not even arrive at all. These circumstances are also foreign to conventional PBX systems. Yet, each of these problems may lead to user-complained about performance deficiencies in VoIP applications and systems.

Conventionally, a VoIP system provider or maintenance organization may need to dispatch a technician to the client site to facilitate troubleshooting the system and network. Needless to say, this is often undesirable. Nonetheless, such a technician may need to capture extensive amounts of data traversing the network, in an attempt to first understand the problem being complained about. This data then typically needs to be communicated to a service center, where it may be analyzed in an attempt to troubleshoot the problem. This data can often exceed several gigabytes. Capturing, transferring and analyzing this data may thus prove problematic, due in part to its voluminous nature. Further, due to the aforementioned increasing complexity of IP networks and VoIP systems, and the possible existence of intermittent problems that may be difficult to reliably reproduce, there is little way to confirm that data indicative of a user experienced problem is even included in the captured data in the first place. Thus, repeated visits by technicians may be typically required.

It is thus desirable to provide a system and method for more rapidly troubleshooting networks and applications that use them, such as IP networks and VoIP systems.

SUMMARY OF THE INVENTION

A computer program product being embodied on a computer readable medium for facilitating troubleshooting a VoIP session associated with at least one VoIP station using network traffic data, the computer program product including computer-executable instructions for: identifying data packets of the network traffic data indicative of VoIP signaling information or voice communications; determining if the identified packets are associated with the at least one VoIP station; determining whether a quality of the VoIP session was acceptable substantially simultaneously with the VoIP session; and, at least temporarily storing at least a portion of the identified packets determined to be associated with the at least one VoIP station when the VoIP session is determined to of an unacceptable quality.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts and in which.

DETAILED DESCRIPTION OF THE PREFERRED EMBODIMENTS

Figure 1:
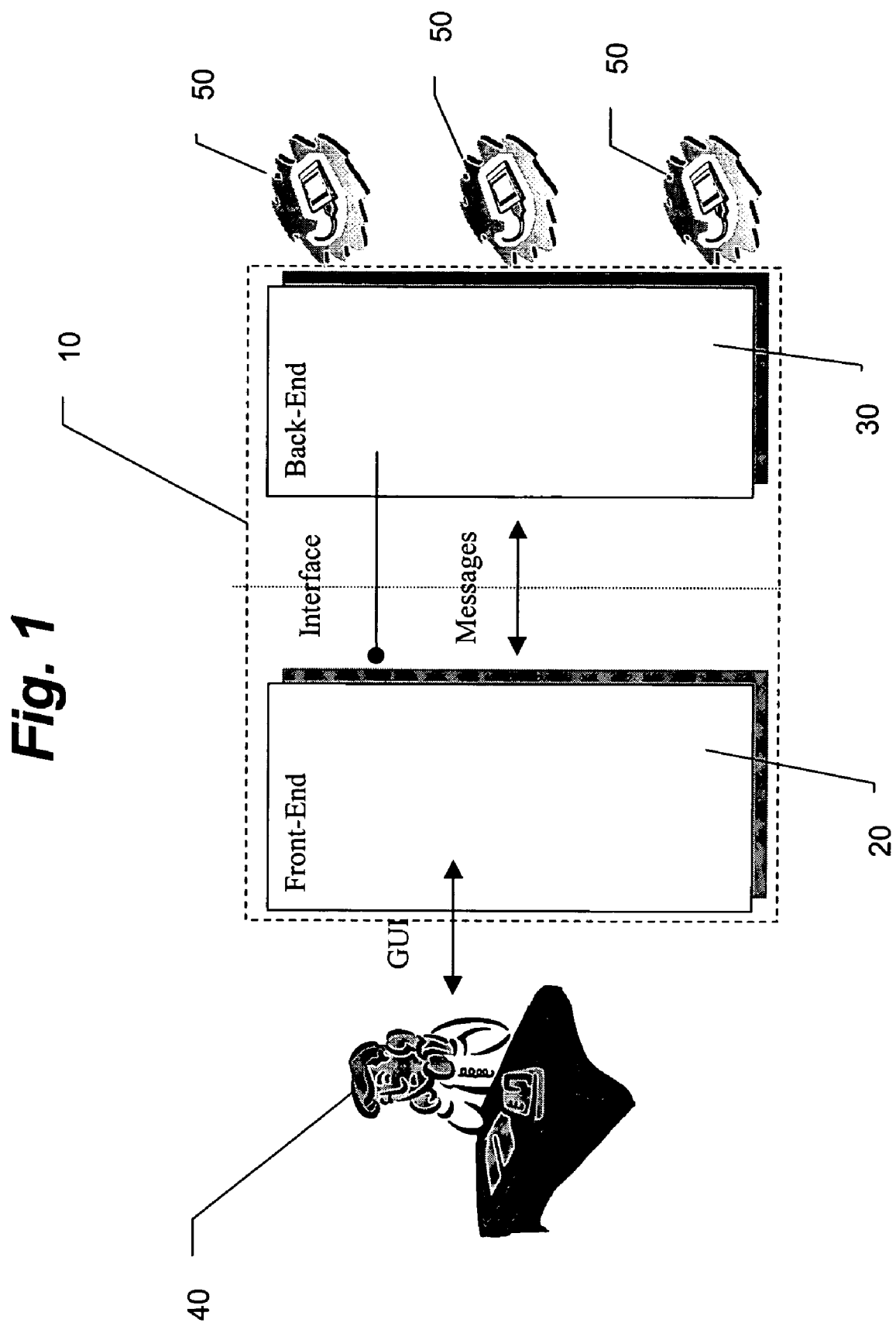
FIG. 1 illustrates a block diagrammatic view of a system according to an aspect of the present invention.

It is to be understood that the figures and descriptions of the present invention have been simplified to illustrate elements that are relevant for a clear understanding of the present invention, while eliminating, for purposes of clarity, many other elements found in typical networks and testing systems. Those of ordinary skill in the art will recognize that other elements may be desirable in implementing the present invention. However, because such elements are well known in the art, and because they do not facilitate a better understanding of the present invention, a discussion of such elements is not provided herein. The disclosure herein is directed to all such variations and modifications known to those skilled in the art.

According to an aspect of the present invention, a Capture Agent (CA) may be provided as a "remote" component of a system according to an aspect of the present invention. The CA may be configured by a technician and built for remote delivery or download to or by a customer, such as via e-mail, on floppy disk, or other conventional manner. Downloading, as used herein, generally means to copy data from a remote source to a computing device, such as from a computing resource associated with the technician, like a file server, to a computer associated with the user, such as a computer locally coupled to a VoIP station, or IP telephone.

The CA may serve to capture data traffic using the customer's computer, and transmit relevant captured data to a service center for retrieval by a technician, such as by uploading relevant captured data to a File Transfer Protocol (FTP) server. As used herein, uploading generally means the opposite of downloading.

According to an aspect of the present invention, the CA may take the form of an application that runs on the computer of a client who is experiencing problems with a VoIP system. The customer computer may be locally coupled to a VoIP station to be tested via a communications interface provided on the VoIP station and computer, such as an Ethernet interface as a non-limiting example. The customer computer may itself be the VoIP station to be tested. Alternatively, the computer may be coupled in a conventional manner to the underlying IP network of the VoIP station to be troubleshot, such as by using test access to the various network elements carrying the traffic. According to an aspect of the present invention, network communications other than VoIP such as FTP, HTTP, e-mail may be addressed in an analogous manner.

Either way, the CA may monitor network traffic for active VoIP conversations using the client computer. Once a conversation has ended, the CA may prompt the user to save or discard data associated with the call. Saved data may contain data packets pertaining to that call, including signaling (i.e., source protocol packets) and voice data (i.e., data protocol packets). Once call data is saved, the CA may cause the file(s) to be transported to a virtual location from which they can be accessed by technicians for example, such as a preconfigured FTP server set up by a VoIP technician. A user may also be provided with an option of saving files locally.

For purposes of completeness, data protocol packets may take any suitable form, such as RTP packets by way of non-limiting example only. "RTP" stands for Real Time Protocol, which is carried in a User Datagram Protocol (UDP). This protocol may be used to carry voice and video real-time media information in a VoIP system. Likewise, source protocol packets may take any suitable form, such as SCCP packets, by way of non-limiting example only. Skinny Client Control Protocol (SCCP) is a Cisco Systems proprietary VoIP signaling protocol, also commonly referred to as "Skinny". SCCP may be used for control and network routing data. Other examples of suitable protocols that may be use, again by way of non-limiting example only, include H.323 and SIP for the source protocol and CRTP for the data protocol. The present invention will be further discussed as it relates to RTP and SCCP packets solely for purposes of clarity of explanation and not for purposes of limiting the present invention.

According to an aspect of the present invention, a CA may be created by a technician using an associated builder application and sent via e-mail or web download, by way of non-limiting example only, to a customer site that is experiencing problems with a VoIP system.

According to an aspect of the present invention, a CA may take the form of an executable with substantially no "install" procedure. For example, installation of components may be limited to a packet driver, to enable the CA to capture data from Network Interface Cards (NICS) associated with the customer computer. Upon activation, the CA may check to see if the driver is installed and, if it is not, the Agent may use embedded resources to run the driver installation.

According to an aspect of the present invention, a CA may analyze all NICs seen on the client's computer by default. A user may have an option of analyzing only one or more select NICs via a configuration dialog, if so desired.

Where the CA takes the form of a bare executable, typically no "uninstall" may be required. If a user wants to uninstall the packet driver, they can do so via the Add/Remove Programs option in the Control Panel, where Microsoft Windows is used as the operating system, for example. While the present invention is discussed as it related to the Microsoft Windows operating system, generally any suitable operating system may be used, such as Windows 98, ME, 2000, XP Pro/Home. Other suitable operating systems may also be used, such as LINUX, SunOS, or Mac OS, all by way of non-limiting example only.

Referring now to FIG. 1, there is shown a block diagram of a CA 10 according to an aspect of the present invention. Generally, CA 10 may include two portions: a front-end 20 associated with a Graphical User Interface (GUI), and a back-end 30 that generally serves as the capture engine itself.

According to an aspect of the present invention, front end 20 may serve to create a GUI window for user 40 interaction. The GUI of front end 20 may allow user 40 to indicate "bad" calls or other problematic activity and initialize and communicate with back-end 30.

Referring more particularly to front end 20 and the GUI presented thereby, when the CA is running on a client computer, an icon may be placed in the system tray, when a Windows operating system is used, for example. This icon may show the state of the CA, such as whether it is currently analyzing a call, for example. When the user right-clicks on the CA icon in the system tray, a popup menu, such as that illustrated in FIG. 2A, may be displayed.

Figure 2A:
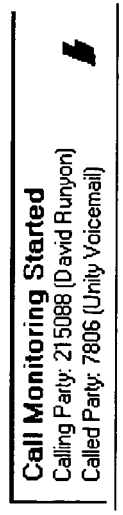
FIGS. 2A-2F illustrate exemplary screens of a graphical user interface of a system according to an aspect of the present invention.

Referring now also to FIG. 2A, activating a "Configure" device may serve to bring up a configuration dialog box. This may also be accomplished by double clicking on the icon in the tray itself, for example. Activating an "About" device may display help features for the CA in a conventional manner, while activating an "Exit" device may exit out of the CA application.

Figure 2C:
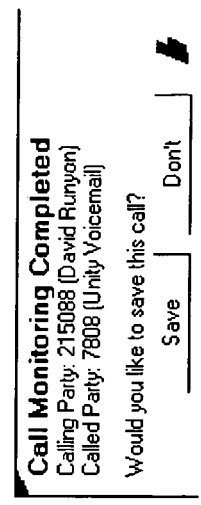
Figure 2B:
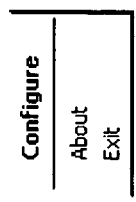

Referring now also to FIG. 2B, there is shown a configuration dialog box that may be displayed upon activation of the aforementioned configuration device seen in FIG. 2A. The configuration dialog box may display configuration information for the CA application, which includes technician contact information and CA settings. "E-Mail" and "Phone Number" devices may display contact information for the technical support personnel attempting to troubleshoot the system. While, a "comment" field may contain the name of the user or name of company distributing it, for example. The "expiration" device illustrated displays a date when the CA executable will expire, and hence cease to operate. While, an "interface" drop list allows a user to select what network interface is currently being used for analysis. A user may optionally select which one he wants to use, which may cause the application to reconfigure using that selection. Selecting all interfaces may have the application analyze traffic on all available Network Interface Cards (NICs). A "capture" drop list may allow a user to select which packets to capture, such as all packets that are related to the current call, more than the current call, or a subset of those related to the current call. An "FTP Address" device may display an FTP address to upload files to be transported to, while a "File Location" box allows a user to select a local virtual location to save files for transport to. A "Transmit Files via FTP" check box enables/disables the sending of captured calls to the FTP server. If this is unchecked, then call related data may be saved locally. Finally, an "Auto Start Application" check box enables/disables the application automatically running when the client computer is booted up. Other application configuration information and settings as applicable to the type of problem being analyzed may also be configured in an analogous manner.

Referring now to FIG. 2C, once a call, or other logical session, has started (i.e. an RTP stream has been established), a call-monitoring window may be displayed. It may "slide" upward from the bottom right corner of the screen and inform the user that a call has started and what parties are involved in the call. This window may be configured in a conventional manner to remain on top, and disappear after a predetermined temporal period, such as 5 seconds, or when the call has ended, whichever comes first, for example. Displayed information may be gathered from corresponding portions of identification packets, such as a SCCP packets, for example.

Figure 2D:
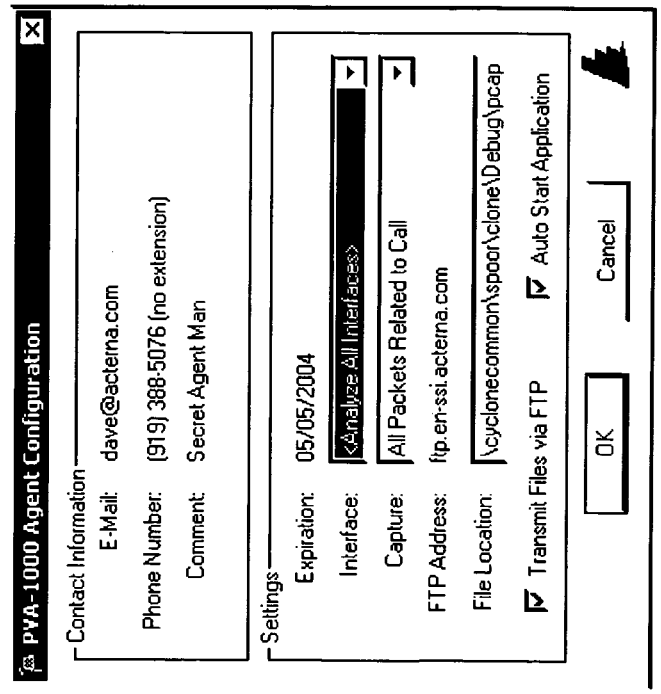

When a call has ended, a save window, such as that illustrated in FIG. 2D, may be displayed. Analogously to the call monitoring window, this window may likewise "slide" upward from the bottom right corner of the screen. According to an aspect of the present invention, the save window may prompt the user to indicate if the quality of the call was bad, with the option of choosing 'Yes' or 'No'. Once the user makes a selection the window may disappear. This window may also be configured to remain on top, and disappear after a given temporal period, such as 15 seconds, or a new call has been started, whichever occurs first, for example. According to an aspect of the present invention, by enabling a user to substantially contemporaneously decide whether a call was problematic, and thus identify and store data indicative of problematic sessions, advances in troubleshooting VoIP systems or other data communications applications may be achieved.

Figure 2F:
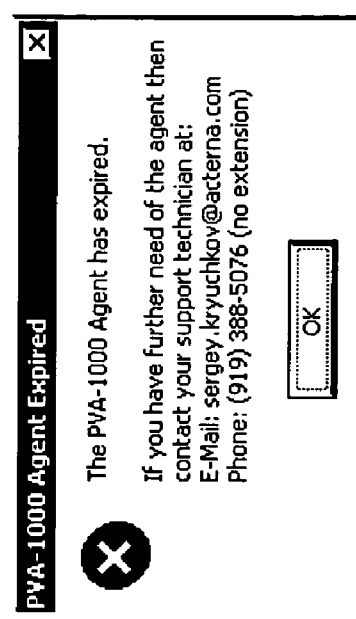
Figure 2E:
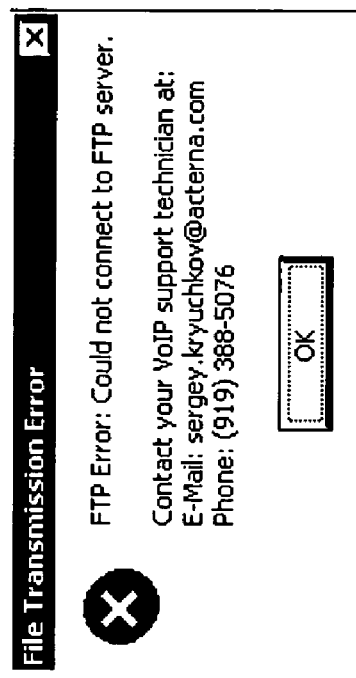

Referring now also to FIG. 2E, a dialog window such as that illustrated therein may appear if the CA has a problem transmitting the files to an FTP server for analysis at a Technical Analysis Center (TAC), for example. There are a variety of errors that can occur. According to an aspect of the present invention, the user may be instructed to contact their support technician for assistance.

According to an aspect of the present invention, each CA may be provided with an expiration date. Once a CA has expired, it may no longer run and display a message box such as that shown in FIG. 2F, for example.

Figure 3:
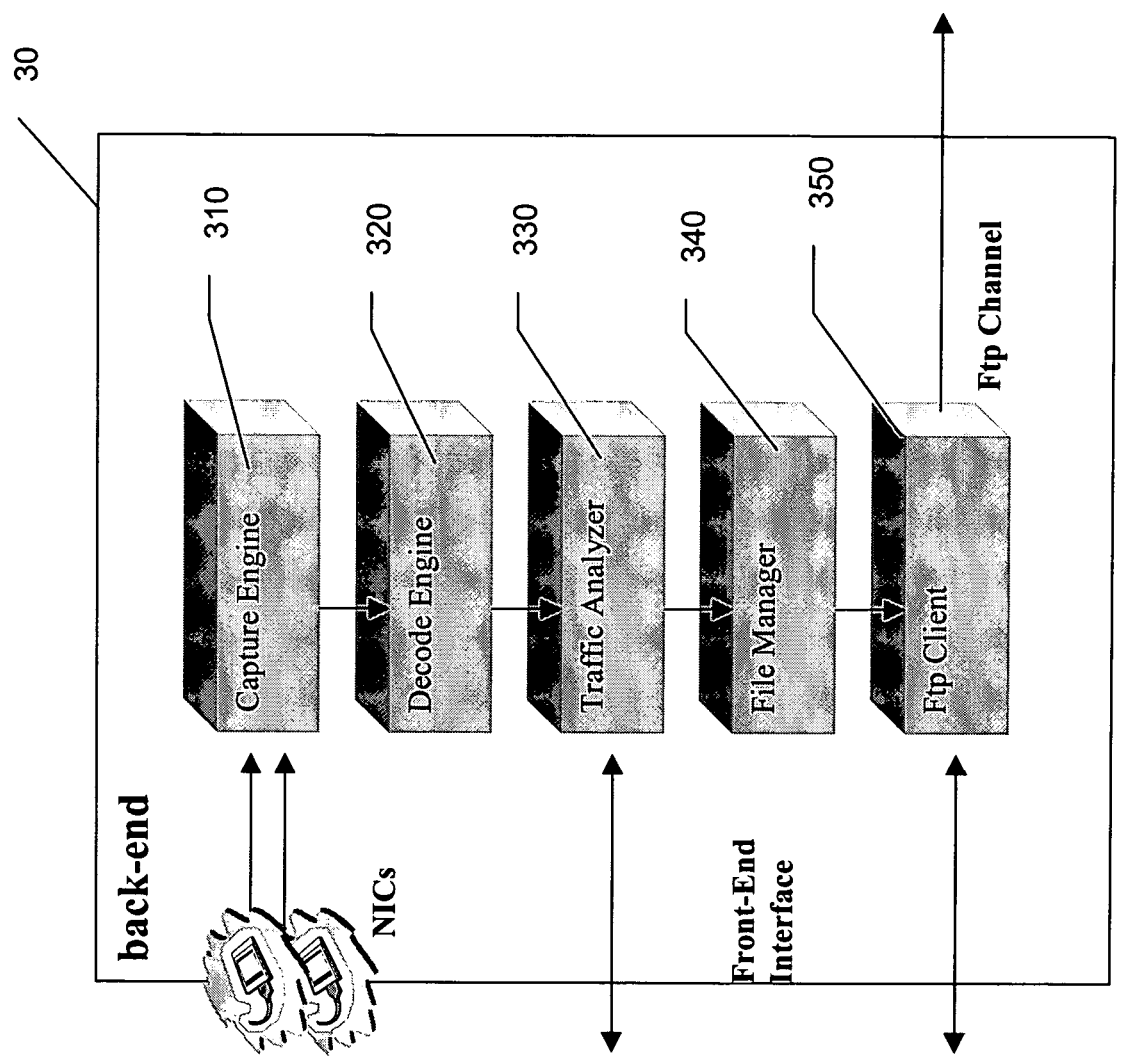
FIG. 3 illustrates a block diagrammatic view of a back end portion of a system according to an aspect of the present invention.

Back-end 30 may generally take the form of a set of modules, each having well-defined responsibilities. Referring again to FIG. 1 and now also to FIG. 3, there is shown a graphical depiction of a block diagram of back end 30 according to an aspect of the present invention. Generally, back end 30 may include a capture engine 310, a decode engine 320, a traffic analyzer 330, a file manager 340 and an FTP client 350.

According to an aspect of the present invention, any suitable packet capture engine, such as a conventional packet capture engine, may be used as capture engine 310. However, any conventional method for monitoring and copying select portions of network traffic associated with a VoIP station to be troubleshot may be used though. Back end 30 may serve to check that a packet driver is in place, and if not to install it. Decode engine 320 may take the form of code suitable for identifying select packets captured by engine 310. Traffic analyzer 330 may take the form of code suitable for analyzing selected packets to identify information associated with them, such as a source and destination addresses. File manager 340 may take the form of code suitable for creating, accessing, writing, closing and deleting data files. Finally, FTP client 350 may take the form of code suitable for transmitting stored files consistently with preconfigured criteria.

Back end 30 may connect to available or selected Network Interface Cards (NICs) 50 associated with the customer computer and switch them into a promiscuous mode if needed. For purposes of completeness, a NIC may commonly take the form of an Ethernet interface on a client computer, but may also take any suitable interface medium for example, such as a fire wire or other type of interface.

Back end 30 may provide the ability for front-end 20 to specify the NIC 50 or NICs 50 to connect to. Back end 30 may serve to receive data traffic from NIC(s) 50. Back end 30 may decode RTP and SCCP packets and analyze the SCCP traffic.

Consequently, back end 30 may create and support a database of VoIP terminals found from the SCCP traffic. Back end 30 may detect events, such as the beginning and ending of calls, and notify front-end 20 of these events. Back end 30 may correlate detected RTP streams, terminals, and calls. Back end 30 may save call-related traffic for later retrieval, such as by storing it into a file. Back end 30 may serve to keep, or transfer, such as via FTP, and remove corresponding call capture files if front-end 20 delivers the user's decision that a call was "bad". If user interaction with front end 20 instead indicates a call was considered "good", the capture file may alternatively just be removed, for example.

Back-end 30 may be initialized in two steps. First, a "class" initialization and then an instance initialization. During "class" initialization, the following steps may be executed. First, back-end 30 may attempt to communicate with the packet driver. If it fails, back-end 30 may then determine that the driver and pertinent DLLs (modules) used to communicate to the driver are not installed. In this case, back-end 30 may pull the driver installation from the one of the resources embedded into the CA executable and install the driver. Back-end 30 may then try to communicate with the driver again.

After the connection to the packet driver is established, the back-end may pull a list of available network interfaces from the packet driver. Back-end 30 may read a current NIC configuration from an ini file or registry, where Microsoft Windows is used as an operating system, for example. This information can be used to decide which NIC ID to connect to. If a configuration does not exist, back-end 30 may assume that it should connect to all network interfaces available on the computer. If a configuration exists, back-end 30 may read the name of the network interface to communicate to, and calculate an interface index in a list of available NICs. If the calculation fails because of the NIC was removed from the system or is otherwise not available, the back-end may just connect to all visible network interfaces.

Back-end 30 may load and parse the application configuration. This configuration may be preserved and delivered to front-end 20. Further, the network interface index and the list of all NICs available on a computer may be preserved and form the "class" data of back-end 30.

An "instance" initialization stage may then execute in the back-end 30. Therein, capture engine 310 may initialize. Back end 30 may also start a high priority analysis thread with the message queue. This thread may serve as the main working thread in the context of the analysis. For purposes of completeness, "thread" as used herein generally refers to a part of an application that can execute independently of other parts.

Back end 30 may also start a high priority thread with the message queue for each thread the CA connects to. Each of these threads may read packets from the NIC, decode them and forward them, if they meet selection criteria, to the analysis thread. According to an aspect of the present invention, decoder engine 320 may take the form of a stateless set of algorithms with no statics or globals, to avoid using synchronization between different threads servicing different NICs, for example.

Back end 30 may initialize the SCCP analyzer. This may include at least saving the front-end 20 window handle to use it for communication between back- and front-ends 30, 20.

Finally, ftp client or engine 350 may be initialized. Ftp client 350 may notify front-end 20 about ftp activity and transferring progress of an ftp dedicated thread with the message queue. This thread may run with a relatively low priority. Communications with the ftp engine may be implemented as an asynchronous thread message exchange.

Figure 4:
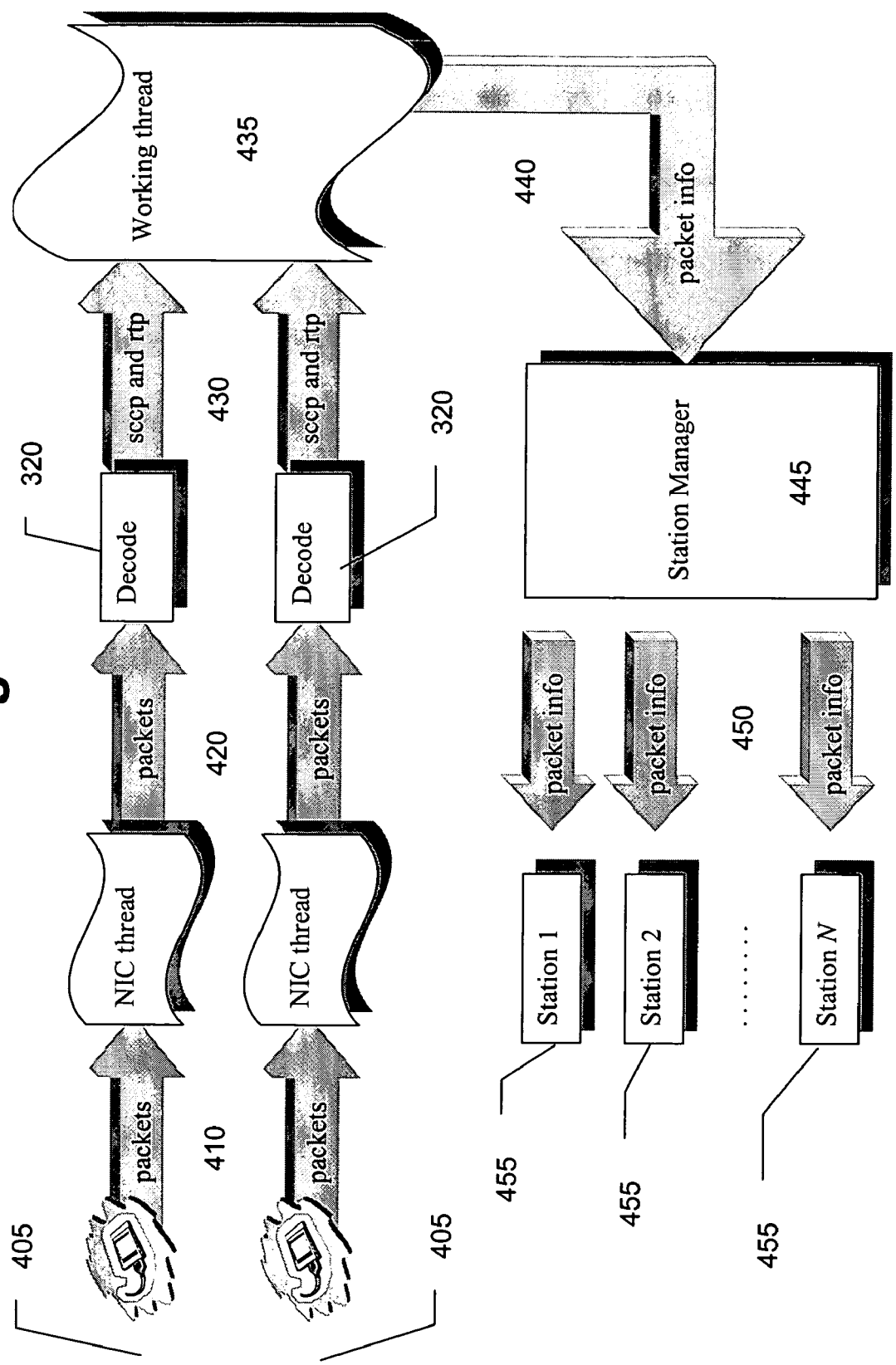
FIG. 4 illustrates a flow diagrammatic view of a system according to an aspect of the present invention.

Referring now also to FIG. 4, there is shown a diagrammatic representation of an exemplary data flow 400 according to an aspect of the present invention. Each NIC 50 being monitored may have a thread 405 devoted to it.

Data flow 400 generally goes through a dedicated thread, such as in the form of a capture engine 310, reading 410 packets from an associated NIC. Packets read 410 may be passed 420 to decode engine 320. Decode engine 320 may serve to determine if each packet it receives is an RTP or SCCP packet. If it is of one of these types, it may be considered for further processing and forwarded 430 to working thread 435 for further processing. If the packet is not an RTP or SCCP packet, it may be not selected, and hence disregarded and dropped. Working thread 435 may serve to redirect 440 RTP and SCCP packets to a station manager 445. Working thread 435 may also provide synchronization. Working thread 445 may provide synchronization without explicitly using message queues instead of "synchronization objects" like mutex or events.

Station manager 445 may serve as traffic analyzer 330 and analyze 450 the destination and source IP addresses and port numbers of packets it receives to identify a VoIP station 455 where the packets were sourced and/or aimed. After the VoIP station 455 is identified, corresponding packets may forwarded to a corresponding virtual station 455 for further processing.

Figure 5:
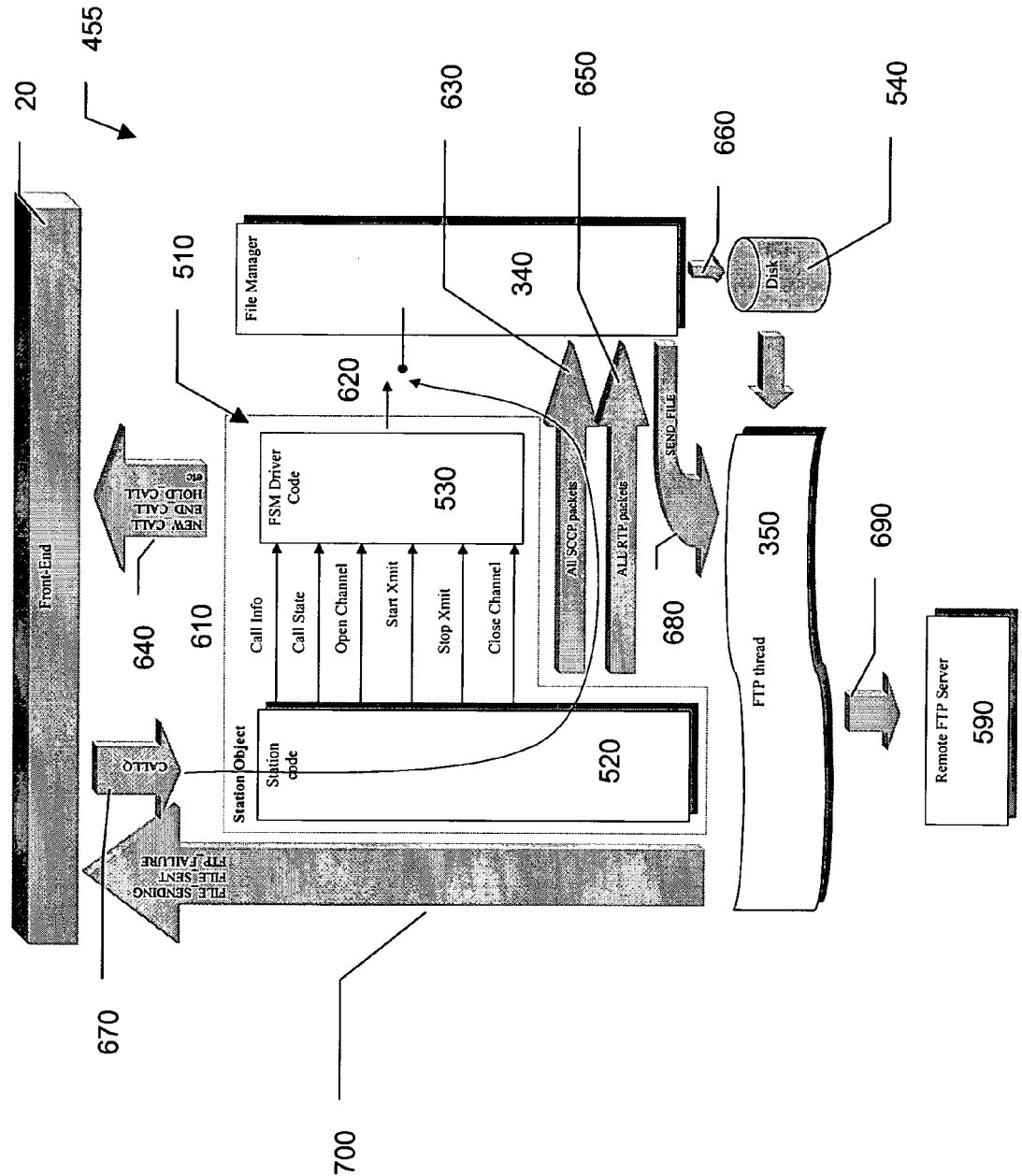
FIG. 5 illustrates a flow diagrammatic view of a virtual station according to an aspect of the present invention; and, FIG. 6 illustrates an exemplary screen of a builder application according to an aspect of the present invention.

Referring now also to FIG. 5, there is another flow diagrammatic representation according to an aspect of the present invention. Each virtual station 455 may include an encapsulated file manager object 320, which is responsible for keeping call capture files open, remembering that each station can have many calls going on at any given time.

Each station object 510 may include station code 520 and a Finite State Machine (FSM) code 530. According to an aspect of the present invention, the virtual station 455 may serve as a main object of the application. Station code 520 may monitor for select SCCP messages, and signal the FSM driver code 530 upon their detection. For example, station code 520 may monitor for Call Info, Call State, Open Channel, Open Channel Ack, Start Xmit, Stop Xmit and Close Channel messages. A Call Info message contains information indicative of phone numbers and party names, and may be used by back-end 30 to generate capture file names, and by front-end 20 to display call information, such as that illustrated in FIG. 2C for example. A Call State message identifies the state of the call. When the call goes to the "connected" state, back-end 30 may send a NEW_CALL message to front-end 20, to trigger a corresponding GUI display, such as that illustrated in FIG. 2C for example. An Open Channel message may serve to ask a VoIP station to open a voice channel. Using this message, the station code may drive 610 the voice channel FSM 530. An Open Channel Ack message is sent by the VoIP station to the Call Manager and generally contains the IP address and port number of the voice channel the station will use. A Start Xmit message contains the IP address and the port number of the remote (not necessarily a VoIP) station for the voice channel. A Stop Xmit message may be used to force a VoIP station to stop transmitting the VoIP. Finally, a Close Channel message forces the VoIP station to close the voice channel. All of these messages may likewise be used to drive 610 FSM 530.

According to an aspect of the present invention, a VoIP station in an narrow sense, such as a VoIP phone, may have several (up to 16 for example) lines and one voice channel. In the following "inactive" means "put on hold" and vice versa. The call-state and call-info messages control the line states (each line can have a call going on which can be active or put on hold). Open-channel, close-channel, start-xmit, and stop-xmit messages control the voice channel state. Each call has an identifier unique for the VoIP station called "reference number". SCCP traffic may be saved into a file corresponding to a currently active call (i.e., a call in the "connected" state). If an SCCP packet contains messages related to the a that is currently inactive (was put on hold), this packet may be saved into a file that corresponds to that inactive call. RTP packets may be saved into the file that corresponds to the currently active call if the voice channel of the VoIP station is in an "opened in both directions" state. As will be recognized by those possessing an ordinary skill in the pertinent arts, an exact sequence SCCP messages arrive in may not matter. And, decisions may be made based on the fact of the presence of the active call and voice channel in "opened in both directions" state.

Responsively to the signaling analysis, a virtual station object 510 may use 620 an interface provided by file manager 340 to open a new file for a new call, to write packets into the file, or to close the file when the call is over. Other SCCP messages may be redirected 630 to file manager 340 without special handling. If a packet that contains messages with, for example, two different call reference numbers is received, a frame may be saved in two capture files corresponding to these calls.

In the process of tracking the call and voice channel state, object 510 may post 640 messages to front-end 20 notifying it about signaling events—thereby enabling front end 20 to generate a GUI such as those shown in FIGS. 2C and 2D. For received RTP packets, object 510 may check FSM if it has an active call. If it does, object 510 may command file manager 340 to write the packet into the active call capture file. If not, the packet may be dropped. This may serve, for example, to avoid capturing tones of background music when a call is on hold.

File manager 340 may create, close and/or write 660 call capture files at a virtual location, such as on a local disk 540, that may be specified as part of the application configuration, as is shown in FIG. 2D, for example.

When object 510 receives a user input about his decision concerning call quality from front end 20, it may then instruct file manager 340 to remove the file from the disk 540, or to rename it and transport it for analysis. If a file is to be transferred, file manager 340 may post 680 the message to ftp thread 350, commanding it to transmit the specified file. Ftp client 350 may then establish an ftp connection, read the file and transmit it 690. In the process of connecting to a destination ftp server 590 and transferring files 690, FTP thread 350 may post 700 messages to front-end 20 notifying front-end 20 about errors or transmit progress and transmit success, to allow generation of an informative GUI, such as that shown in FIG. 2E.

Using the Open Channel and Open Channel Acknowledge, and Start Xmit messages, the CA may extract information, such as the remote IP address and local and remote ports for the new call, to be used to identify corresponding RTP packets. Upon detecting a corresponding start x-mit message, the corresponding RTP packets may be locally stored, thus providing a local copy of the voice communications over the VoIP system for that call. Upon detecting a corresponding Stop x-mit message, RTP packets may cease to be captured. And, upon detecting a corresponding close channel message and call state disconnected message and Stop Xmit message, the local RTP packets containing file may be closed and the user presented with an inquiry of whether the call data should be saved or discarded, such as that illustrated in FIG. 2D, for example.

Referring now to FIG. 6, there is shown a display screen suitable for use with a builder for a CA according to the present invention. Technicians may use the builder to create each individual agent for distribution. The builder may encode each agent with information necessary to properly run on a client PC, while also giving the technician flexibility to create customized agents for individual customers and specific problems and different VoIP systems and configurations.

According to an aspect of the present invention, the builder may generally work by loading a template file. This file is basically a hollowed out agent. Each agent may include a section that contains the customizable information. When the builder creates the agent, it may make a copy of the template and implant the configured information into the resource section of the agent.

According to an aspect of the present invention, the builder may include editable fields that are used to configure an agent. Mandatory fields may be presented in a highlighted fashion, such as in bold, and typically must be filled in by the technician before an agent may be built.

An "Input File Name" device may be used to specify the file name of the template to be used. A "Customer Name" device may be used to enter the name of the customer. A "Technician Name" device may be used to enter the name of the technician. A "Technician Phone Number" device may be used to enter a phone number for contacting technicians. A "Technician e-mail" device may be used to enter e-mail contact information for the technicians. A "Comments" device may be used to enter any special comments for this agent. An "FTP Address" device may be used to specify an FTP address for the agent to transmit its stored data files to. An "FTP Location for Capture Files" device may be used to specify a directory on the FTP server to save the files to. An "FTP User Name" device may be used to specify an FTP login name for the files transmitted. An "FTP User Password" may be used to specify an FTP login password for use with the files transmitted. A "Send Files via FTP" device may be used to specify whether an agent should transmit its stored files via FTP. An "Expiration" device may be used to enter a number of days, from its creation, before the agent is set to expire. A "Capture" device may be used to designate a capture mode the agent should implement. For example, whether or not the agent should capture all packets that are related to the current call, while all others will be ignored. Finally, an "Output File Name" device may be used to name the agent executable.

According to an aspect of the present invention, automatic determinations of connection quality based on pre-configured thresholds may be provided. In other words, instead of treating a communication as acceptable or unacceptable responsively to user input, a CA may itself determine whether the communication was acceptable by evaluating measures associated with the call. For example, jitter amount, packet loss and/or overall signal delay may be compared to threshold values to determine whether the call should be characterized as troublesome, regardless of user input being received or not. Additionally, analogous thresholding may be used to determine whether the user should be prompted with an inquiry of whether or not to characterize the communication as troublesome or problematic.

It will be apparent to those skilled in the art that modifications and variations may be made in the apparatus and process of the present invention without departing from the spirit or scope of the invention. Thus, it is intended that the present invention cover the modification and variations of this invention provided they come within the scope of the appended claims and their equivalents.

What is claimed is:

1. A computer program product being embodied on a computer readable medium for facilitating troubleshooting a VoIP session associated with at least one VoIP station using network traffic data, said computer program product comprising computer-executable instructions for:
   identifying data packets of said network traffic data indicative of VoIP signaling information or voice communications;
   determining if said identified packets are associated with said at least one VoIP station;
   determining whether a quality of the VoIP session was acceptable substantially simultaneously with the VoIP session; and,
   at least temporarily storing at least a portion of said identified packets determined to be associated with the at least one VoIP station when the VoIP session is determined to of an unacceptable quality.

2. The product of claim 1, wherein said identified packets comprise source protocol packets.

3. The product of claim 1, wherein said identified packets comprise SCCP packets.

4. The product of claim 1, wherein said identified packets comprise data protocol packets.

5. The product of claim 1, wherein said identified packets comprise RTP packets.

6. The product of claim 1, wherein said identified packets comprise source protocol and data protocol packets.

7. The product of claim 1, wherein sad identified packets comprise SCCP and RTP packets.

8. The product of claim 1, wherein said determining whether a quality of the VoIP session was acceptable substantially simultaneously with the VoIP session is at least partially dependent upon user input.

9. The product of claim 8, further comprising computer-executable instructions for inducing a user interface prompting said user for said user input.

10. The product of claim 9, further comprising computer-executable instructions for identifying ones of said identified packets indicative of the end of the VoIP session, wherein said inducing said user interface is responsive to said identifying ones of said identified packets indicative of the end of said VoIP session.

11. The product of claim 1, wherein said determining whether a quality of the VoIP session was acceptable substantially simultaneously with the VoIP session is at least partially dependent upon predetermined criteria and at least one characteristic of the VoIP session.

12. The product of claim 1, wherein said determining whether a quality of the VoIP session was acceptable substantially simultaneously with the VoIP session at least partially occurs during said VoIP session.

13. The product of claim 1, wherein said determining whether a quality of the VoIP session was acceptable substantially simultaneously with the VoIP session occurs temporally near the end of the VoIP session.

14. The product of claim 1, further comprising computer-executable instructions for identifying ones of said identified packets indicative of the beginning of the call.

15. The product of claim 14, further comprising computer-executable instructions for inducing a user interface indicative of the beginning of the VoIP session responsively to said identifying ones of said identified packets indicative of the beginning of the VoIP session.

16. The product of claim 1, wherein the product is custom built at least partially dependently upon at least one characteristic of the at least one VoIP station.

17. The product of claim 1, further comprising computer-executable instructions for automatically disabling the computer program product after a given temporal period.

18. The product of claim 1, further comprising computer-executable instructions for transferring said at least temporarily stored packets.

19. The product of claim 18, wherein transferring uses file transport protocol.

20. The product of claim 1, further comprising computer-executable instructions for capturing said network traffic data.

21. The product of claim 20, further comprising computer-executable instructions for selecting a network interface to capture said network traffic data.

22. The product of claim 21, further comprising computer-executable instructions for storing data indicative of available network interfaces.

23. A method for facilitating troubleshooting a VoIP session associated with at least one VoIP station using network traffic data, said method comprising:
   identifying data packets of said network traffic data indicative of VoIP signaling information or voice communications;
   determining if said identified packets are associated with said at least one VoIP station;
   determining whether a quality of the VoIP session was acceptable substantially simultaneously with the VoIP session; and,
   at least temporarily storing at least a portion of said identified packets determined to be associated with the at least one VoIP station when the VoIP session is determined to of an unacceptable quality.

* * * * *